_United States Patent Office_

2,956,067
Patented Oct. 11, 1960

2,956,067

CERTAIN SURFACTANTS AND METHOD OF MAKING SAME

Melvin De Groote and Jen Pu Cheng, University City, Mo., assignors to Petrolite Corporation, Wilmington, Del., a corporation of Delaware No Drawing. Filed July 5, 1956, Ser. No. 595,823

6 Claims. (Cl. 260—404.5)

The present invention is concerned with combining certain oxyalkylation-susceptible polyols composed exclusively of carbon, hydrogen and oxygen with epoxidized fatty acid derivatives so as to introduce a fatty acid radical by an ether linkage. Such linkage is, of course, differentiated from an ester linkage by the fact that it is not susceptible to saponification or hydrolysis. The intermediate thus obtained is then reacted with a polyamino compound characterized, for example, by polyethylene amines such as ethylene diamine, diethylene triamine, tetraethylene pentamine, triethylene tetramine, etc., or with oxyalkylated derivatives thereof as, for example, oxyethylated or oxypropylated polyamines of the kind described immediately preceding.

The combination between the fatty acid radical and the amine generally is by virtue of the carboxyl group or the equivalent, as for example, the ester group when the epoxidized product happens to be an ester which is usual as in the case of epoxidized soybean oil or epoxidized butyl soyate. The expression "soyate" is applied to esters or salts derived from soybean fatty acids.

The polyols employed are characterized by freedom from any radical having 8 uninterrupted carbon atoms and the molecular weights, including those obtained by oxyalkylation, may run as high as 10,000. The polyols may be water-soluble in almost any proportion as in the case of sorbitol, glycerol, diglycerol, ethylene glycol, low molecular weight propyleneglycols, etc. They may be water insoluble by virtue of the fact that a water-insoluble glycol is employed, such as a higher molecular weight polypropyleneglycol, for instance, molecular weight of 1,000 or more, or even a fairly low molecular weight polybutyleneglycol, for instance, in the range of 300 to 500. Furthermore, the polyols may be water-insoluble by virtue of the fact that an initially water-soluble polyol of the kind previously mentioned has been reacted with propylene oxide, butylene oxide, or the like, to render the product insoluble. Similarly, such product can be resolubilized, i.e., rendered soluble in water again by oxyalkylation with ethylene oxide, glycide or the like. Inversely, one may start with a water-insoluble glycol such as a high molecular weight polypropyleneglycol, or a polybutyleneglycol, and react with ethylene oxide or glycide or both so as to obtain a water-soluble product.

Furthermore, one may use glycols of the kind referred to above and, generally speaking, obtained by the use of one or more olefin oxides of the kind previously described and having distinct surface active properties. Such surface active properties are characterized by ability to change certain surface active characteristics of either an aqueous or nonaqueous fluid. These characteristics include the ability to lower the surface tension of a liquid, for instance, water or paraffin oil; to change the interfacial tension at the interface between water and oil or water and some other liquid; and the ability to form emulsions, to show dispersing properties for solids and liquids, such as a dispersion of carbon black in oil or in water, or at least to some extent possibly show detergent or detergent-like properties. The simplest test of all is the ability of the product to disperse in water, although it is recognized that at times there may be a profound increase in hydrophile properties before this threshold is reached. In light of these well known properties it is believed the characteristics included in the claims are perfectly obvious to those skilled in the art.

Inversely, just as hydrophile effects become obvious by measuring the balance between the hydrophobe portion and the hydrophile portion, it also follows that as this balance is inverted the same properties tend to be reduced as, for example, in the oxypropylation of ethylene glycol or polyethylene glycol as previously specified.

The reason valuable compounds can be obtained from such a wide variety of initial reactants carrying through the spectrum of low molal water soluble polyols such as sorbitol, glycerol, diglycerol, triglycerol, low molal ethylene glycols, low molal propyleneglycols, through an area having surface activity in either water or oil and into comparatively high molal water insoluble products such as high molal polypropyleneglycols, high molal polybutyleneglycols, etc., is because the acyl radical to which the oxirane ring is attached introduces a radical having up to 22 uninterrupted carbon atoms and usually 18 uninterrupted carbon atoms as in the instance of the higher fatty acids. Thus, depending on the number of such radicals so introduced, the hydrophobe character can be increased enormously at the intermediate stage.

The hydrophobe character can then be offset by introduction of a polyamine or oxyalkylated polyamine so as to form an amine radical or ester radical.

For convenience, what is said hereinafter will be divided into seven parts:

Part 1 is concerned with the preparation of suitable epoxides which include an acyl radical having at least 8 carbon atoms;

Part 2 is concerned with suitable polyols;

Part 3 is concerned with suitable polyamines with the proviso that such polyamines must have at least one reactive hydrogen atom so as to enter into reaction by amidification, esterification, etc.;

Part 4 is concerned with intermediates which are derived from reactants described in Part 1 and Part 2;

Part 5 is concerned with products obtained by reaction between the intermediate obtained in the manner described in Part 4, preceding, and the amines described in Part 3, preceding;

Part 6 is concerned with uses for the herein described products of reaction; and Part 7 is concerned with derivatives which may be obtained from the herein described resultant, and uses for said derivatives obtained by further reaction.

PART 1

The epoxidation of ethylenic compounds and particularly esters of unsaturated fatty acids, unsaturated aliphatic alcohols, and the unsaturated fatty acids themselves, is well known. For instance, it has been described in the following patents:

U.S. PATENTS NOS.

| | |
|---|---|
| 2,443,280 | 2,556,145 |
| 2,445,892 | 2,567,237 |
| 2,457,328 | 2,567,930 |
| 2,458,484 | 2,569,502 |
| 2,485,160 | 2,661,367 |
| 2,487,829 | 2,686,805 |
| 2,510,905 | 2,692,271 |

Additionally epoxidation procedures have been described in the trade literature of organizations which supply one or more reactants employed in the procedure. For instance, see Bulletin P63-355 entitled "Hydrogen Peroxide—Resin Technique for the Preparation of Peracetic Acid," E. I. du Pont de Nemours & Company; Bulletin P61-454 entitled "Hydrogen Peroxide-Resin Technique for Epoxidation of Unsaturated Fats, Oils, and Derivatives," E. I. du Pont de Nemours & Company; and booklet entitled "Hydrogen Peroxide" issued by Buffalo Electro-Chemical Company, Inc. See also Chemical Week, August 21, 1945, page 100; and Chemical Week, December 25, 1954, page 32.

An excellent brief description is found in aforementioned U.S. Patent No. 2,692,271, dated October 19, 1954, to Greenspan et al. What is said immediately following is substantially as it appears in said patent.

In broad aspect, epoxidation comprises a reaction at a point of unsaturation of the ethylene type in a carbon compound whereby the unsaturated linkage is by the addition of oxygen changed to an oxirane compound.

Fatty acids and fatty acid derivatives which may be subjected to epoxidation by conventional procedures are illustrated by the following:

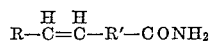

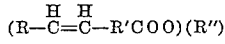

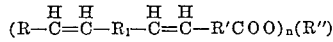

In the above formulas R and R' represent monovalent and divalent hydrocarbon radicals having at least 3 carbon atoms. $R_1$ is a divalent radical.

Stated another way, it is preferable that the ethylene linkage which is subjected to epoxidation is at least 2 carbon atoms removed from the terminal carbon atom or the carboxyl carbon atom.

In the last two formulas R'' represents the ester radical which may be monohydric, dihydric, trihydric, tetrahydric, etc.

In the last formula $n$ is a small whole number varying from 2 to 6 for example, which corresponds to the valency of the multivalent radical R''.

The vegetable oils which when epoxidized may be used in practicing the present invention are those glycerides of saturated and unsaturated acids which have a degree of unsaturation represented by an iodine value of from 90 to 205 and in which the fatty acids neither are hydroxylated nor possess conjugated unsaturation. The semi-drying vegetable oils, which are primarily glycerides of oleic and linoleic acids, are preferred. Among those oils which may be used are epoxidized peanut, rapeseed, cottonseed, corn, tobacco seed, cucurbit, sunflower, safflower, poppyseed, linseed, perilla, and soybean oils. Of these epoxidized oils, soybean oil is particularly efficient.

If the fatty acid group has some other functional group present, difficulty may be involved in obtaining optimum yields for some reason that is not entirely clear. This would apply, for example, to castor oil, and ricinoleic acid esters. On the other hand, if castor oil is reacted with a low molal acid such as acetic acid, propionic acid, or the like, then these difficulties appear to be eliminated. There also appears to be difficulty in obtaining suitable yields in the case of conjugated unsaturation. In some instances where the unsaturation is not conjugated there is indication that there may be a shift during reaction to produce conjugation. In other words, in the epoxidation of the fatty acid or fatty acid ester or the like, if the fatty acid is polyethylenic it is very important that the ethylenic radicals be non-conjugated. The fatty acids themselves may contain 8 to 22 carbon atoms. The best example of the monoethylenic acid is, of course, oleic acid and perhaps erucic acid. Both are readily available as glycerides. As to the polyethylenic acids, particular attention is directed to linoleic. As to an example of an acid having 3 ethylenic linkages attention is directed to linolenic. These acids, of course, are available in the form of glycerides, particularly mixed glycerides. Other polyethenoic acids are obtained from oils of aquatic origin.

PART 2

The polyhydric alcohols include the glycols, polyglycols previously referred to, various trihydroxylated compounds such as glycerol trimethylolethane, glycerol trimethylolpropane, etc. See additionally the polyhydric alcohols and their oxyalkylation derivatives described in Tables 1, 2, 3 and 4 of U.S. Patent No. 2,552,528 dated May 15, 1951, to De Groote.

See also the glycols described as reactants in the table which appears in U.S. Patent No. 2,556,878 dated August 7, 1951, to Blair, as to a variety of polybutyleneglycols, polyethylene glycols and polypropyleneglycols, ranging in molecular weights up to 12,000, 15,000 or 20,000. See the catalogs of any one of a number of companies which make such glycols with particular reference to the catalog and the commercial literature of the Dow Chemical Company, Midland, Michigan, and Carbide & Carbon Corporation, New York City.

Briefly stated, there are available commercially butyleneglycols and polybutyleneglycols in molecular weights up to 1,000 or more. There are available ethyleneglycols and polyethyleneglycols in molecular weights up to 15,000 to 20,000. There are available propyleneglycols and polypropyleneglycols in molecular weights up to 2,000 and even up to 2,750 and perhaps 3,000. Others, or mixed glycols can be prepared by conventional procedures.

Our preference is to employ materials which are initially surface active in either an aqueous solvent or a non-aqueous solvent. Our preference is to use compounds which have been described in one or more of the patents previously referred to or in certain other patents, or in certain pending applications. For instance, aforementioned U.S. Patent No. 2,552,528 describes high molal oxypropylation derivatives of monomeric polyhydric compounds with the proviso that the initial polyhydric reactant have at least 4 hydroxyl radicals.

Similarly, U.S. Patent 2,552,529, dated May 15, 1951, to De Groote, describes high molal oxypropylation derivatives of monohydric polyhydric compounds with the proviso that the initial polyhydric reactant have at least 6 hydroxyl radicals and that there be present a radical having 6 carbon atoms in a single chain, at least 5 of which are directly attached to oxygen atoms.

U.S. Patent No. 2,673,882, dated March 30, 1954, to Griffin, describes a compound of the formula $$R([OA_1]_m[OA_2]_nOH)_6$$

wherein R is the residue of a hexitol, $A_1$ and $A_2$ represent, respectively, alkylene radicals of different 1,2-alkylene oxides containing no more than 3 carbon atoms, $m$ and $n$ each represent a number above 6, and the ratio of $m:n$ lies within the limits 1:3 to 3:1.

U.S. Patent No. 2,674,619 dated April 6, 1954, to Lundsted describes a cogeneric mixture of conjugated polyoxypropylene-polyoxyethylene compounds containing in their structure oxypropylene groups, oxyethylene groups and an organic radical derived from an organic compound containing a plurality of reactive hydrogen atoms.

In greater detail the same patent describes compounds having improved detergent properties, according to the formula $HO-(C_2H_4O)_x(C_3H_6O)_y(C_2H_4O)_{x'}-H$ where where $y$ equals at least 15; and 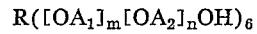 equals 20-90%, of the total weight of the compound.

Patent application, Serial No. 520,011, filed July 5, 1955, De Groote, now abandoned, describes a surface-active cogeneric mixture; said surface-active mixture being in turn a cogeneric mixture of oxyalkylation derivatives of $HO(C_2H_4O)(C_2H_4O)_nH$, in which $n$ represents an integer which on the average is not over 6 including zero; said oxyalkylation involving (a) oxypropylation as an intermediate step, followed by (b) oxyethylation; said oxypropylated intermediate prior to oxyethylation being characterized by water insolubility; said final product being characterized by the fact that the hydrophobe property of the intermediate is offset to a significant degree by the final stage oxyethylation; the average theoretical molecular weight of said cogeneric mixture being not less than 1200 and not over 10,000.

Patent application, Serial No. 520,012 filed July 5, 1955 by De Groote, now abandoned, describes a surface-active cogeneric mixture; said surface-active mixture being in turn a cogeneric mixture of oxyalkylation derivatives of HO(C₂H₄O)(C₂H₄O)ₙH, in which $n$ represents an integer which on the average is not over 39 including zero; said oxyalkylation involving (a) oxybutylation as an intermediate step, followed by (b) oxyethylation; said oxybutylated intermediate prior to oxyethylation being characterized by water insolubility; said final product being characterized by the fact that the hydrophobe property of the intermediate is offset to a significant degree by the final stage oxyethylation; the average theoretical molecular weight of said cogeneric mixture being not less than 850 and not over 10,000.

Patent application, Serial No. 520,013 filed July 5, 1955, by De Groote, now abandoned, describes a surface-active cogeneric mixture; said surface-active mixture being in turn a cogeneric mixture of oxyalkylation derivatives of HO(C₂H₄O)(C₂H₄O)ₙH, in which $n$ represents an integer which on the average is not over 39 including zero; said oxyalkylation involving (a) oxybutylation and oxypropylation as an intermediate step, followed by (b) oxyethylation; said oxybutylated intermediate prior to oxyethylation being characterized by water insolubility; said final product being characterized by water insolubility; said final product being characterized by the fact that the hydrophobe property of the intermediate is offset to a significant degree by the final stage oxyethylation; the average theoretical molecular weight of said cogeneric mixture being not less than 850 and not over 10,000.

PART 3

The polyamines which may be employed as reactants fall within two types. The first type is characterized by the fact that the polyamines have at least one primary amino radical separated from another primary or secondary amino radical by two to three carbon atoms in a single chain. These polyamines under certain conditions can form cyclic amidines and thus are important from what is said in Part 6, subsequently.

One may use polyamines corresponding to the formula

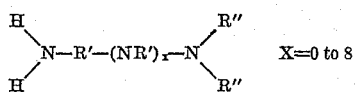   X=0 to 8 in which R″ is hydrogen, alkyl, cycloalkyl, aryl, or aralkyl and R′ is a divalent radical such as

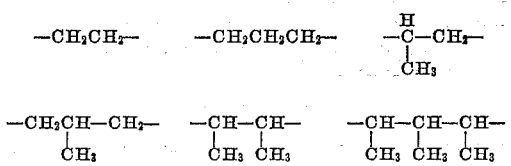

Stated another way, the polyamines have at least one primary amino group separated from another primary or secondary amino group by 2 to 4 carbon atoms. Examples of suitable amines include:

ethylenediamine
    diethylenetriamine
    triethylenetetramine
    tetraethylenepentamine
    propylenediamine
    dipropylenetriamine
    tripropylenetetramine
    butylenediamine
    aminoethylpropylenediamine
    aminoethylbutylenediamine

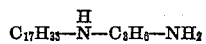

Other suitable polyamines in which the nitrogen atoms are separated by a carbon atom chain having 4 or more carbon atoms include the following: Tetramethylenediamine, pentamethylenediamine, and especially hexamethylenediamine. The latter is of particular interest because the product is commercially available in light of its use in the manufacture of synthetic fibre.

If desired, one can prepare a variety of reactants having two or more amino groups and at least one hydroxyl group. One may use modifications of procedures or the procedures themselves as described in U.S. Patents Nos. 2,046,720 dated July 7, 1936, to Bottoms; 2,048,990 dated July 28, 1936 to Britton et al.; 2,447,821 dated August 24, 1948 to Sankus, and 1,985,885 dated January 1, 1935, to Bottoms. Examples include the following:

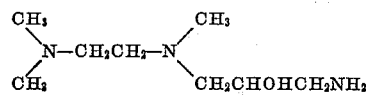

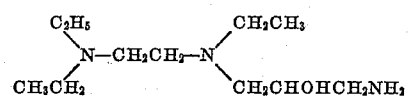

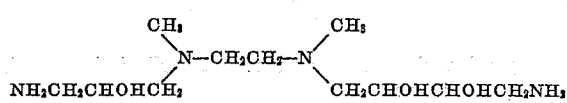

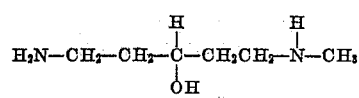

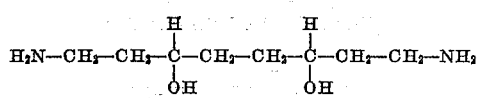

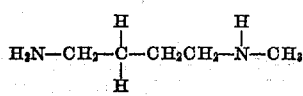

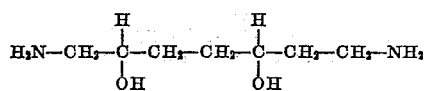

Other suitable amines are exemplified by ethylenebisoxypropylamine.

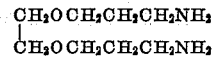

and derivatives obtained by treating ethylenebisoxypropylamine with 1, 2, 3 or 4 moles of ethylene oxide, propylene oxide, butylene oxide, or the like.

Other compounds including those having cyclic structures include piperazine, and the corresponding derivatives obtained by treating piperazine with alkylene oxides. The same applies to substituted piperazine such as the 2,5-dimethylpiperazine.

As to mono-substituted dialkanol piperazine see U.S. Patent No. 2,421,707, dated June 3, 1947, to Malkemus.

Another example of polyamine which may be employed as a reactant is the kind described as "Duomeens."

As to the commercial products above noted, and other compounds, attention is directed to the fact that Duomeen is a trademark designation for certain diamines made by Armour Chemical Division, Armour & Company, Chicago, Illinois. The Duomeens have the following general formula

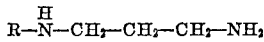

R is an alkyl group derived from a fatty acid or from the mixed fatty acids as obtained from certain oils. The specific Duomeen and the source of the radical R are as follows:

(1) Duomeen 12    R=lauric (2) Duomeen C     R=Coconut oil fatty acid (3) Similarly, a comparable diamine, presumably obtained from Rosin Amine D and acrylonitrile, is obtainable from Hercules Powder Company, Wilmington, Delaware. The composition of Rosin Amine D is as follows:

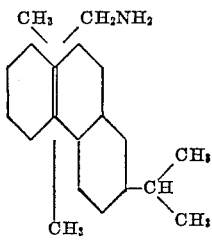

Polyamines from monoamines and cyclic imines, such as ethylene imine.

(4)
$$C_8H_{17}-\overset{H}{N}-CH_2CH_2-NH_2$$
N-octyl ethylenediamine (5)
$$C_{14}H_{29}-\overset{H}{N}-CH_2CH_2-NH_2$$
N-tetradecyl ethylenediamine (6)
$$C_{16}H_{33}-\overset{H}{N}-CH_2-CH_2-NH_2$$
N-hexadecylethylenediamine (7)
$$C_{12}H_{25}-\overset{H}{N}-C_2H_4-\overset{H}{N}-C_2H_4-\overset{H}{N}-C_2H_4-NH_2$$
N-dodecyl triethylenetetramine (8)
$$C_{12}H_{25}-\overset{H}{N}-C_3H_6-NH_2$$
N-dodecyl propylenediamine (9)
$$C_{10}H_{21}-\overset{H}{N}-C_4H_8-NH_2$$
N-decyl butylenediamine

(10)  Polyamines containing tertiary amino groups:

(11)
$$C_{12}H_{25}-\overset{H}{N}-C_3H_6-\overset{C_2H_5}{\underset{|}{N}}-C_2H_5$$
N'-dodecyl, N N-diethyl propylenediamine It is to be noted that all the above examples show high molal groups, i.e., 8 carbon atoms or more. The same derivatives in which methyl, ethyl, propyl, butyl, amyl, hexyl groups, or the like, appear instead of octyl decyl, etc., are equally satisfactory.

PART 4

Part 4 is concerned with intermediates which are derived by reaction between suitable epoxides as described in Part 1 and suitable polyols as described in Part 2.

The reaction, or reactions, involving the two classes of initial materials are illustrated by the following examples:

Example 1a

A 500 ml. 3-necked resin flask was fitted with a reflux condenser, a thermometer, a dropping funnel and an efficient stirrer. In the flask was placed 110 grams of epoxy butyl stearate containing approximately one oxirane ring per mole and 300 grams of polyethylene glycol 1000. The flask was first heated to melt the polyglycol, then vigorous stirring was applied to bring the heterogeneous mixture into a fine emulsion. When the temperature of the emulsion reached 65° C. heating was discontinued and 0.4 grams of 70% perchloric acid was added as the catalyst. The reaction was exothermic in nature. It was kept at 70–75° C. by first ice cooling, then air cooling, then gentle heating. At the end of an hour, the mixture became clear, homogeneous and completely water dispersible. It was reacted for one more hour at 70–75° C. to insure complete reaction. The product was a clear light yellow liquid when hot, a soft white solid when cold. It was xylene and alcohol soluble and water dispersible. It was highly effective in the demulsification of water-in-oil type emulsions.

In Table I which follows subsequently there are summarized a large number of examples including Example 2a to 7a, inclusive.

Example 8a

One mole of anhydrous sorbitol was oxyalkylated first with 30 moles of propylene oxide and then with 80 moles of ethylene oxide at 150–180° C. in the presence of sodium methoxide. (CF. U.S. Patent 2,552,529 to DeGroote). To 332 grams of this reaction product, 1.7 grams of sodium methoxide and 45 grams of epoxy butyl stearate were added. The mixture was first stirred at room temperature for 10 minutes. Then heat was applied to maintain the reaction temperature at 115° C. for 2.5 hours and 170° C. for 2 hours. The equipment used was the same as used in Example 1a. At the end of the reaction the product was a brown colored semi-solid. It was soluble in xylene, alcohol and water and was effective as an emulsifier in oil-in-water type emulsions.

Table I previously referred to also includes Examples 9a to 16a, inclusive.

Example 17a

In the same equipment set up as used in Example 1a, 180 grams of epoxidized soybean oil and 210 grams of methoxy polyethylene glycol 350 were reacted at 75° C. for 3 hours in the presence of 0.39 grams of 70% perchloric acid. The reaction was carried out with frequent ice-water cooling during the first 25 minutes, then with gentle heating during the rest of the time. The product was a clear, light yellow, viscous liquid. It was soluble in xylene and alcohol and dispersible in water.

Table I previously referred to also includes Examples 18a to 28a, inclusive.

Example 29a

Anhydrous sorbitol was oxyalkylated with ethylene oxide in a 1–8 molal ratio. To 267 grams of this reaction product 320 grams of epoxy methyl soyate and 2.7 grams of sodium methoxide were added. The mixture was first reacted at 115° C. for 2 hours; then at 160° C. for 2.5 hours. The product was a dark brown homogeneous viscous liquid. It was completely water-soluble but was also xylene-soluble.

As previously noted, examples illustrated previously are representative of a larger group. The data in regard to this group appear in summarized form in Table I immediately following.

TABLE I
REACTION CONDITIONS

| Ex. No. | Oxirane containing reactant | Amt., gms. | Polyhydroxy containing reactant | Amt., gms. | Molal ratio | Catalyst used | Amt., gms. | Temp., °C. | Time, hrs. |
|---|---|---|---|---|---|---|---|---|---|
| 1a | Epoxy butyl stearate | 110 | Polyethylene glycol, 1000 | 300 | 1:1 | Perchloric acid, 70% | 0.4 | 70–75 | 2 |
| 2a | do | 36.8 | Polyethylene glycol, 6000 | 300 | 2:1 | do | 0.34 | 70–80 | 2 |
| 3a | do | 368 | Polypropylene glycol, 150 | 150 | 1:1 | do | 0.5 | 70 | 1.5 |
| 4a | do | 110 | Polypropylene glycol, 1025 | 308 | 1:1 | do | 0.41 | 70 | 2 |
| 5a | do | 368 | Glycerol | 92 | 1:1 | do | 0.46 | 65 | 2 |
| 6a | do | 184 | Methoxy polyethylene glycol, 750 | 375 | 1:1 | do | 0.56 | 70 | 2.5 |
| 7a | do | 184 | Polyethylene glycol, 150+10 ethylene oxide. | 285 | 1:1 | Sodium methoxide | 2.3 | 110–120, 160–170 | 2.5, 1 |
| 8a | do | 45 | Sorbitol +30 propylene oxide +80 ethylene oxide. | 332 | 2:1 | do | 1.7 | 115, 170 | 2.5, 2 |
| 9a | do | 147 | Pentaerythritol +20 propylene oxide +10 ethylene oxide. | 347 | 2:1 | do | 2.5 | 115, 170 | 2, 2 |
| 10a | do | 368 | Glycerol +3 ethylene oxide | 118 | 2:1 | do | 2.4 | 115, 170 | 2, 2 |
| 11a | do | 221 | Diglycerol +8 ethylene oxide | 155 | 2:1 | do | 1.9 | 115, 170 | 2, 2.5 |
| 12a | Epoxidized soybean oil | 300 | Ethylene glycol | 62 | 1:3 | Perchloric acid, 70% | 0.36 | 65 | 2 |
| 13a | do | 30 | Polyethylene glycol, 4000 | 400 | 1:3 | do | 0.43 | 70 | 2 |
| 14a | do | 300 | Propylene glycol | 76 | 1:3 | do | 0.38 | 75 | 3 |
| 15a | do | 60 | Polypropylene glycol, 2025 | 405 | 1:3 | do | 0.46 | 75 | 3 |
| 16a | do | 150 | Sorbitol | 91 | 1:3 | do | 1.2 | 138 | 5 |
| 17a | do | 180 | Methoxy polyethylene glycol, 350 | 210 | 1:3 | do | 0.39 | 75 | 3 |
| 18a | do | 150 | Methoxy polyethylene glycol, 550 | 275 | 1:3 | do | 0.43 | 75 | 3 |
| 19a | do | 90 | Polypropylene glycol, 150+20 ethylene oxide. | 309 | 1:3 | Sodium methoxide | 2 | 110, 170 | 3, 1 |
| 20a | do | 90 | Polypropylene glycol, 150+5 butylene oxide +10 ethylene oxide. | 285 | 1:3 | do | 1.8 | 115, 170 | 2, 2 |
| 21a | do | 90 | Glycerol +30 ethylene oxide | 423 | 1:3 | do | 2.6 | 110, 170 | 1, 2 |
| 22a | do | 160 | Glycerol +3 propylene oxide +9 ethylene oxide. | 331 | 1:3 | do | 2.4 | 110, 170 | 2, 2 |
| 23a | Epoxy methyl soyate | 192 | Polyethylene glycol, 200 | 120 | 1:1 | Perchloric acid, 70% | 0.3 | 65 | 2 |
| 24a | do | 160 | Polyethylene glycol, 600 | 300 | 1:1 | do | 0.46 | 68 | 2 |
| 25a | do | 192 | Polypropylene glycol, 425 | 255 | 1:1 | do | 0.44 | 75 | 2 |
| 26a | do | 320 | Butylene glycol | 90 | 1:1 | do | 0.41 | 75 | 2 |
| 27a | do | 320 | Butynediol, 1.4 | 86 | 1:1 | do | 0.4 | 55 | 4.5 |
| 28a | do | 320 | Diglycerol | 83 | 2:1 | do | 0.4 | 70 | 2 |
| 29a | do | 320 | Sorbitol +8 ethylene oxide | 267 | 2:1 | Sodium methoxide | 2.7 | 115, 160 | 2, 2.5 |
| 30a | do | 64 | Sorbitol +60 ethylene oxide | 282 | 2:1 | do | 1.7 | 115, 160 | 2, 3 |
| 31a | do | 128 | Sorbitol +6 propylene oxide +30 ethylene oxide. | 370 | 2:1 | do | 2.5 | 115, 160 | 2, 3 |
| 32a | do | 128 | Pentaerythritol +20 ethylene oxide | 203 | 2:1 | do | 1.7 | 115, 160 | 2, 3 |
| 33a | do | 128 | Pentaerythritol +20 propylene oxide +10 ethylene oxide. | 347 | 2:1 | do | 2.4 | 115, 160 | 2, 3 |

REACTION PRODUCT

| Ex. No. | Theo. mole. weight | Color and state | Xylene solubility | Isopropanol solubility | Water solubility |
|---|---|---|---|---|---|
| 1a | 1,368 | Soft white solid | Yes | Yes | Dispersible. |
| 2a | 6,736 | White wax-like solid | Yes | Yes | Yes. |
| 3a | 518 | Light yellow oil | Yes | Yes | No. |
| 4a | 1,393 | Light yellow viscous liquid | Yes | Yes | No. |
| 5a | 460 | White oil | Yes | Yes | Dispersible. |
| 6a | 1,118 | Pale yellow viscous liquid | Yes | Yes | Do. |
| 7a | 958 | Brown viscous liquid | Yes | Yes | Do. |
| 8a | 6,178 | Brown soft solid | Yes | Yes | Yes. |
| 9a | 2,472 | Dark brown viscous liquid | Yes | Yes | Yes. |
| 10a | 960 | Brown liquid | Yes | Yes | Yes. |
| 11a | 1,254 | Amber colored viscous liquid | Yes | Yes | Yes. |
| 12a | 1,086 | Pale yellow oil | Yes | Yes | No. |
| 13a | 12,900 | White wax-like solid | Yes | Yes | Yes. |
| 14a | 1,128 | Light yellow viscous liquid | Yes | Yes | No. |
| 15a | 6,975 | Dark yellow viscous liquid | Yes | Yes | No. |
| 16a | 1,446 | Dark brown soft solid | No | Yes | No. |
| 17a | 1,950 | Light yellow viscous liquid | Yes | Yes | Dispersible. |
| 18a | 2,550 | do | Yes | Yes | Do. |
| 19a | 3,990 | Brown viscous liquid | Yes | Yes | Do. |
| 20a | 3,750 | Dark brown viscous liquid | Yes | Yes | Do. |
| 21a | 5,136 | Brown viscous liquid | Yes | Yes | Do. |
| 22a | 2,886 | Dark brown viscous liquid | Yes | Yes | No. |
| 23a | 520 | Golden yellow oil | Yes | Yes | No. |
| 24a | 920 | Light yellow viscous liquid | Yes | Yes | Dispersible. |
| 25a | 745 | Yellow viscous liquid | Yes | Yes | No. |
| 26a | 410 | Dark yellow oil | Yes | Yes | No. |
| 27a | 406 | Brown oil | Yes | Yes | No. |
| 28a | 806 | Yellow liquid | Yes | Yes | Dispersible. |
| 29a | 1,174 | Dark brown viscous liquid | Yes | Yes | Yes. |
| 30a | 3,460 | Dark brown semi-solid | Yes | Yes | Yes. |
| 31a | 2,490 | Dark brown very viscous liquid | Yes | Yes | Yes. |
| 32a | 1,656 | Dark brown viscous liquid | Yes | Yes | Yes. |
| 33a | 2,376 | do | Yes | Yes | No. |

(1) Polyethylene glycols 1,000, 6,000 etc. and polypropylene glycols 150, 1,025, etc. were products of Carbide and Carbon Chemicals Company having average molecular weights of 1,000, 6,000 etc. and 150, 1,025 etc., respectively.

(2) Methoxy polyethylene glycol 350, 750 etc. were polyethylene glycol monomethyl ethers having average molecular weights of 350, 750 etc., respectively. They were also products of Carbide and Carbon Chemical Company.

PART 5

As has been stated previously, the intermediate, or intermediates, obtained in the manner described in part 4 preceding are reacted with polyamines of the kind described in Part 3 preceding. The procedure is illustrated by the following examples, some of which are given in detail and others in tabular form:

*Example 1b*

In a 500 ml. 3-necked flask, equipped with a Barrett type distillation receiver, a condenser, a thermometer and a sealed stirrer, 31 grams of diethylenetriamine were reacted with 273 grams of the reaction product obtained from Example 1a. The reaction temperature was first maintained at 130° C. for 2 hours, then raised to 190 C. in 20 minutes. When the temperature reached 190° C., butyl alcohol began to collect in the distillation receiver. The heating was continued for 3 more hours to bring the temperature up to 240° C. At 240° C. no more alcohol was collecting and the reaction was considered complete. The distillate consisted of 24.5 grams of butyl alcohol and 0.4 cc. of water. The product was a dark brown soft solid. It was soluble in xylene, alcohol and water. Its salts with acetic acid and glycolic acid showed excellent bactericide ability on the sulfide-producing type of bacteria.

*Example 2b*

In the same equipment set up as used in Example 1b, 101 grams of the reaction product of Example 1b were heated from 280° C. to 305° C. in 1.5 hours to transform the polyamino alkylene amide into an amino imidazoline structure. During the entire period of reaction, a slow stream of nitrogen was introduced into the flask through a side tube to facilitate the removal of the water liberated. 5.3 cc. of water and 2.1 cc. of dark yellow oil were collected in the receiver. The product was a black semi-solid. It was xylene, alcohol and water soluble. Besides being a very good bactericide for the sulfide-producing bacteria, it also inhibited corrosion of ferrous metals in a hydrogen sulfide-hydrocarbon oil system.

Additional Examples 3b through 21b inclusive appear in Table II immediately following.

PART 6

The products herein described, and particularly those which are basic due to the fact that there are present two or more basic nitrogen atoms, have utility for many purposes and particularly in the field of cationic surfactants. What is said herein applies not only to the products as such but also to salts thereof which may be obtained by combination with low molal acids such as acetic acid, glycolic acid, lactic acid, propionic acid, diglycolic acid, adipic acid, succinic acid, etc. Such products and others herein described may all be used for the resolution of petroleum emulsions of the water-in-oil type. The products without further reaction are particularly valuable as additives for lubricating oils which are derived from sources other than petroleum.

As to specific uses for the herein described compounds including the various salts it is to be noted such compounds are valuable as a fuel oil additive in the manner described in U.S. Patent 2,553,183, dated May 15, 1951, to Caron et al. It can be used in substantially the same proportions or lower proportions and this is particularly true when used in conjunction with a glyoxalidine or amido glyoxalidine.

An analogous use in which these products are equally satisfactory, is that described in U.S. Patent No. 2,665,978, dated January 12, 1954, to Stayner et al. The amount employed is in the same proportion or lesser amounts than referred to in said aforementioned Caron et al. patent.

The second use is for the purpose of inhibiting fogs in hydrocarbon products as described in U.S. Patents No. 2,550,981 and 2,550,982, both dated May 1, 1951, and both to Eberz. Here again it can be used in the same proportions as therein indicated or even smaller proportions.

A third use is to replace oil soluble petroleum sulfonates, so-called mahogany soaps, in the preparation of

TABLE II

| Ex. No. | Compound used | Amt., gms. | Polyamine or oxyalkylated polyamine used | Amt., gm. | Temp., °C. | Time, hr. | Product of Reaction |
|---|---|---|---|---|---|---|---|
| 1b | 1a | 273 | Diethylene triamine | 31 | 130<br>190–240 | 2<br>3 | Dark brown semi-solid xylene alcohol and water soluble |
| 2b | 1b | 101 | ____do____ | | 280–305 | 1.5 | Black semi-solid xylene alcohol and water soluble. |
| 3b | 3a | 259 | Tetraethylene pentamine | 94.5 | 130<br>190–240 | 2<br>3 | Dark brown semi-solid, xylene alcohol and water sol. |
| 4b | 5a | 230 | Duomeen S [1] | 200 | 130<br>190–240 | 2<br>3 | Brown semi-solid, xylene and alcohol sol. Water insol. |
| 5b | 6a | 224 | N-phenyl 2 methyl 1,2 propane diamine. | 33 | 130<br>190–240 | 2<br>3 | Do. |
| 6b | 7a | 287 | 1,6 Hexane diamine 72% | 48.3 | 130<br>190–240 | 2<br>3 | Brown soft paste xylene and alcohol sol. water dispersible. |
| 7b | 10a | 240 | Tetrahydroxyethyl ethylene diamine | 118 | 190–250 | 5 | Dark brown soft paste xylene and alcohol soluble water dispersible. |
| 8b | 12a | 290 | Triethylene tetramine | 117 | 130<br>220–240 | 2<br>3 | Brown viscous liquid xylene alcohol and water sol. |
| 9b | 8b | 254 | ____do____ | | 280–310 | 1.5 | Black soft solid xylene, alcohol and water sol. |
| 10b | 14a | 188 | Amine 333 [2] | 73 | 130<br>220–240 | 2<br>3 | Dark brown very viscous liquid xylene, alcohol soluble water dispersible. |
| 11b | 10b | 130 | ____do____ | | 280–310 | 1.5 | Black tacky solid xylene and alcohol soluble water dispersible. |
| 12b | 16a | 160 | Hydroxyethyl ethylene diamine | 34.6 | 130<br>220–240 | 2<br>3 | Black semi-solid alcohol soluble slightly xylene soluble water dispersible. |
| 13b | 18a | 250 | 1,1 dimethyl, 2 hydroxyethyl, 1,2 propanediamine. | 47 | 130<br>220–240 | 2<br>3 | Dark brown very viscous liquid xylene and alcohol soluble water dispersible. |
| 14b | 20a | 250 | N,N diethyl ethylene diamine | 23.2 | 130<br>220–240 | 2<br>3 | Dark brown viscous liquid, xylene and alcohol soluble. |
| 15b | 22a | 200 | Diethyl aminopropylamine | 27 | 130<br>220–240 | 2 | Do. |
| 16b | 24a | 230 | Ethylene diamine 75% | 20 | 110<br>160–200 | 3<br>2 | Dark amber viscous liquid, xylene and alcohol soluble water dispersible. |
| 17b | 16b | 150 | ____do____ | | 280–300 | 1.5 | Greenish brown soft solid xylene and alcohol soluble water dispersible. |
| 18b | 26a | 250 | Propylene diamine | 45 | 110<br>160–200 | 3 | Dark amber viscous liquid xylene and alcohol soluble. |
| 19b | 28a | 250 | Propylene triamine | 55 | 110<br>160–200 | 3<br>2 | Brown viscous liquid, xylene alcohol and water soluble. |
| 20b | 29a | 200 | Dihydroxyethyl ethylene diamine | 54.5 | 160–200 | 5 | Dark brown semi-solid xylene and alcohol soluble water dispersible. |
| 21b | 32a | 200 | Tetrahydroxyethyl ethylene diamine | 57 | 160–200 | 5 | Dark brown tacky solid, xylene and alcohol soluble water dispersible. |

[1] Duomeen S was a product of Armour Chemical Division. It was Amino propyl alkyl amine where the alkyl radical was derived from soybean fatty acid.
[2] Amine 333 was a product of Olin Mathieson Chemical Company. It was a mixture of diethylene triamine, triethylene tetramine and tetraethylene pentamine in equal weight proportion.

certain emulsions, or soluble oils or emulsifiable lubricants where such mahogany soaps are employed.

Another use is where the product does not serve as an emulsifying agent alone but serves as an adjunct.

Briefly stated, the fourth use is concerned with use as a coupling agent to be employed with an emulsifying agent. See "The Composition and Structure of Technical Emulsions," J. H. Goodey, Roy. Australian Chem. Inst. J. & Proc., vol. 16, 1949, pp. 47–75. As stated in the summary of this article—

"The technical oil-in-water emulsion is regarded as a system of four components: the dispersion medium, consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent, which is a water-soluble substance involving an hydrocarbon radical attached to an ionizable group."

Fifth, these materials have particular utility in increasing the yield of an oil well by various procedures which in essence involve fracturing of the strata by means of liquid pressure. A mixture of these products with oil, or oil in combination with a gel former alone or a gel former and finely divided mineral particles, yields a product which, when it reaches crevices in the strata which are yielding water, forms a gelationous mass of curdy precipitate or solid or semi-solid emulsion of a high viscosity. In any event, it represents a rapid sealing agent for the strata crevices and permits pressure to be applied to fracture the strata without loss of fluid through crevices, openings or the like.

Such compounds or derivatives also are effective for other purposes, such as an anti-fogging agent in motor fuels, a coagulation preventive in burner oils, and as an additive for the prevention of corrosion of ferrous metals.

The herein described products and the derivatives thereof are particularly valuable in flooding processes for recovery of oil from subterranean oil-bearing strata when employed in the manner described in U.S. Patent No. 2,233,381, dated February 25, 1941, to DeGroote and Keiser.

Furthermore, the herein described products may be employed to increase operating efficiency by increasing the oil-to-brine ratio or by increasing the total oil recovery in primary recovery operations as differentiated from secondary recovery operations. The procedures employed are essentially those as described in either U.S. Patent No. 2,331,594, dated October 12, 1943, to Blair, or U.S. Patent No. 2,465,237 dated March 22, 1949, to Larsen.

When the products of the kind herein described are used for water flooding and particularly in the form of salts, they have unusual value in a fresh water or brine system for the inhibition of the growth of both anaerobic and aerobic bacteria but are particularly applicable in controlling the sulfate reducing organisms which cause difficulty in secondary recovery operations. Thus, one may use some other agent or agents in water flood systems and use compounds as herein described primarily for reducing bacterial growth. The use of such an industrial bactericide is well known and the procedure is conventional; for instance, one can use the methods described in an article entitled "The Role of Microorganisms" by R. C. Allred, which appeared in Producers Monthly, Vol. 18, No. 4, pages 18–22.

Attention again is directed to the fact that in many cases the cogeneric mixtures herein described contain a significant or substantial amount of cyclic amidines or cyclic amidine derivatives. There is no intention of differentiating between the unneutralized product, the hydrate formed on combination with water, and the salts. As far as we have been able to determine in every instance the amount of cyclic amidine compounds or derivatives present represent approximately one-third or more, probably one-half or more, of the total cogeneric mass. In many instances probably two-thirds, or almost the entire cogeneric mass, is characterized by the cyclic amidine structure.

In the use of the herein described products as industrial bactericides and particularly in connection with water flood operations, we prefer to use the salts obtained by partial or total neutralization with carboxy acids, particularly monocarboxy acids having not over 6 carbon atoms, and preferably a hydroxylated acid such as hydroxyacetic acid.

Specific attention is directed to the article entitled "Preparation of Water for Injection Into Water Reservoirs," which appeared in the Journal of Petroleum Technology, volume 7, No. 4, page 9 (April 1955). The author is Torrey.

PART 7

The products obtained in the manner herein described are valuable for various purposes as indicated in Part 6, preceding. Where salts can be formed, i.e., where the products are basic in character this applies to the salts as well as to the unneutralized material. However, one of the most important uses for the herein described products is as an intermediate for further reaction. It is obvious that reactions of the kind described previously invariably and inevitably yield oxyalkylation susceptible compounds, products or cogeneric mixtures. The reason is that when the oxirane ring is open there is produced a hydroxyl group. This hydroxyl group is susceptible to oxyalkylation and there may be present other groups which likewise are susceptible to oxyalkylation as, for example, when an epoxidized soyabean oil is reacted with 1, 2 or 3 moles of a polyamine. Thus, the products previously described may be combined with a variety of reactants as chemical intermediates, for instance, with various diepoxides or polyepoxides. They may be combined with a number of other monoepoxides such as epichlorohydrin, styrene oxide, glycide and methylglycide. They may be reacted with alkyl glycidyl ether, glycidyl isopropyl ether, and glycidyl phenyl ether.

Furthermore, such products may be reacted with alkylene imines such as ethylene imine or propylene imine, to produce cation-active materials. Instead of an imine, one may employ what is a somewhat equivalent material, to wit, a dialkylaminoepoxypropane of the structure

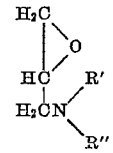

wherein R' and R" are alkyl groups.

Having thus described our invention, what we claim as new and desire to secure by Letters Patent, is

1. The polyamine containing reaction products obtained by reacting at a temperature of about 110° C. to 310° C. for from about 1.5 to 5 hours (A) the resultant of reaction at a temperature of about 65° C. to 170° C. for from about 1 to 5 hours between (a) an oxirane ring-containing compound obtained by epoxidation of an unsubstituted epoxidation-susceptible material containing an ethylenic linkage selected from the class consisting of higher fatty acids containing 8 to 22 carbon atoms, lower alkanol esters of higher fatty acids containing 8 to 22 carbon atoms, amides of higher fatty acids containing 8 to 22 carbon atoms, and naturally occurring glycerides of higher fatty acids, said compound having on the average, approximately one oxirane ring on each fatty acid radical, and (b) oxyalkylation-susceptible polyols and oxyalkylated polyols composed of carbon, hydrogen and oxygen atoms, said polyhydroxylated compounds being characterized by freedom from any radical having at least 8 uninterrupted carbon atoms, freedom from functional groups other than hydroxy groups and a molecular weight not in excess of 10,000; said reactants being nonresinuous in nature; the proportions of (a) and (b) being from about 0.5 to 1 mole of (b) per oxirane ring in (a); the reaction involving rupture of each oxirane ring and being limited to formation of the following grouping

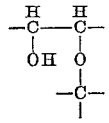

and (B) an acylation susceptible polyamine composed of carbon, hydrogen, oxygen and nitrogen atoms, having only functional groups selected from the class consisting of hydroxyl groups, primary amino groups and secondary amino groups, and having at least one such functional group, the proportion of (B) being at least equimolar to (A).

2. The reaction products of claim 1, wherein the oxirane ring-containing compound is obtained by epoxidation of a fatty acid ester and wherein the acylation susceptible polyamine is a polyalkylene polyamine.

3. The reaction product of claim 2 in which the polyamine is ethylene diamine.

4. The reaction product of claim 2 in which the polyamine is diethylene triamine.

5. The reaction product of claim 2 in which the polyamine is triethylene tetramine.

6. The reaction product of claim 2 in which the polyamine is tetraethylene pentamine.

References Cited in the file of this patent

UNITED STATES PATENTS

| | | |
|---|---|---|
| 2,542,062 | Swern | Feb. 20, 1951 |
| 2,567,237 | Scanlan et al. | Sept. 11, 1951 |
| 2,712,535 | Fisch | July 5, 1955 |
| 2,778,855 | Shokal | Jan. 22, 1957 |